(12) United States Patent
Hagiwara et al.

(10) Patent No.: US 6,613,706 B2
(45) Date of Patent: Sep. 2, 2003

(54) DIELECTRIC CERAMIC COMPOSITION AND CERAMIC CAPACITOR

(75) Inventors: Tomoya Hagiwara, Tokyo (JP); Koichiro Morita, Tokyo (JP); Youichi Mizuno, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 10/153,677

(22) Filed: May 24, 2002

(65) Prior Publication Data

US 2003/0013598 A1 Jan. 16, 2003

(30) Foreign Application Priority Data

Jun. 12, 2001 (JP) ......................................... 2001-176985

(51) Int. Cl.[7] ....................... C04B 35/468; C04B 35/00; H01G 4/10; H01G 4/06

(52) U.S. Cl. ...................... 501/134; 501/137; 501/138; 501/139; 501/1; 428/332; 361/321.2; 361/321

(58) Field of Search ............................. 361/321.2, 321.3, 361/321.4, 321.5; 428/332; 501/134, 137, 138, 139, 1

(56) References Cited

U.S. PATENT DOCUMENTS 6,510,039 B1 * 1/2003 Morita et al. ............ 361/321.2

* cited by examiner

Primary Examiner—David Brunsman
(74) Attorney, Agent, or Firm—Bacon & Thomas, PLCC

(57) ABSTRACT

A dielectric ceramic composition includes sintered ceramic grains having a core-shell structure, wherein 50%~80% of the grains have a domain width of twin smaller than 20 nm; not greater than 30% of the grains have a domain width of twin in the range from 20 nm to 50 nm; not smaller than 10% of the grains have a domain width of twin greater than 50 nm or have no twin.

16 Claims, 1 Drawing Sheet

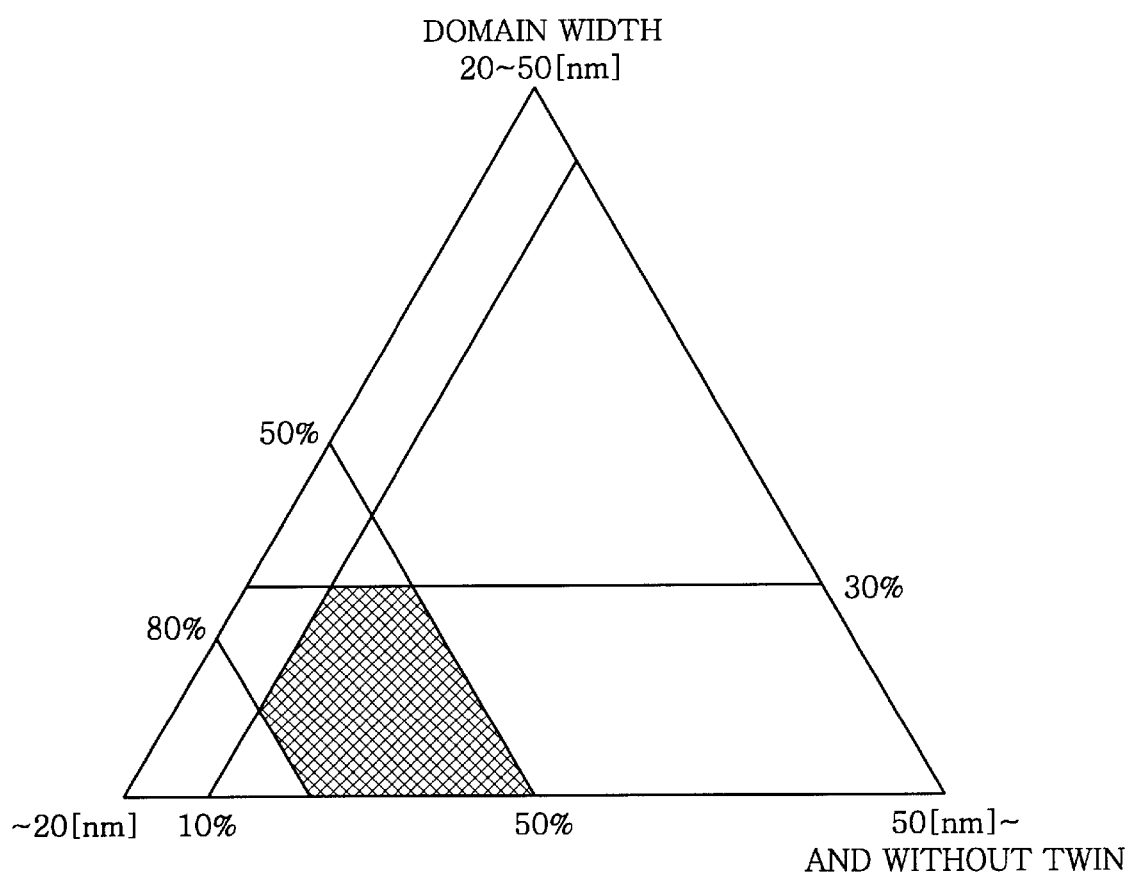

DIELECTRIC CERAMIC COMPOSITION AND CERAMIC CAPACITOR

FIELD OF THE INVENTION

The present invention relates to a reduction resistive dielectric ceramic composition containing therein ceramic grains of a core-cell structure and a ceramic capacitor including therein dielectric layers made by using such a ceramic composition.

BACKGROUND OF THE INVENTION

Recently, a base metal, e.g., Ni, has been widely used in forming internal electrodes of a multilayer ceramic capacitor for the purpose of reducing manufacturing costs and various reduction resistive dielectric ceramic compositions capable of being sintered simultaneously with the internal electrode composed of the base metal have been developed. One of the reduction resistive dielectric ceramic compositions is a barium titanate-based dielectric ceramic composition including ceramic grains of a core-shell structure.

However, in case where a multilayer ceramic capacitor, which fulfils the X7R characteristic (EIA standards) and the B characteristic (EIAJ standards), is manufactured by employing a barium titanate-based dielectric ceramic composition having a dielectric constant equal to or greater than 3000 and internal electrodes composed of the base metal such as Ni, its accelerated life and temperature characteristics become unacceptably deteriorated.

SUMMARY OF THE INVENTION

It is therefore, an object of the present invention to provide a ceramic capacitor exhibiting such electric characteristics as an accelerated life equal to or greater than 200,000 seconds, a capacitance variation not smaller than −10% at 85° C. (compared with that obtained at a temperature of 20° C.) and not smaller than −15% at 125° C. (compared with that obtained at a temperature of 25° C.), and tan δ of 3.5% or less, wherein the ceramic capacitor is manufactured by employing a reduction resistive dielectric ceramic composition possessing a high dielectric constant equal to or greater than 3000.

In accordance with one aspect of the invention, there is provided a dielectric ceramic composition including: sintered ceramic grains having a core-shell structure, wherein 50%~80% of the grains have a domain width of twin smaller than 20 nm; not greater than 30% of the grains have a domain width of twin in the range from 20 nm to 50 nm; not smaller than 10% of the grains have a domain width of twin greater than 50 nm or have no twin.

In accordance with another aspect of the invention, there is provided a ceramic capacitor including: more than one internal electrodes; and one or more dielectric layers composed of a dielectric ceramic composition, each of the dielectric layers being sandwiched between two neighboring internal electrodes, wherein the dielectric ceramic composition includes sintered ceramic grains having a core-shell structure, wherein 50%~80% of the grains have a domain width of twin smaller than 20 nm; not greater than 30% of the grains have a domain width of twin in the range from 20 nm to 50 nm; not smaller than 10% of the grains have a domain width of twin greater than 50 nm or have no twin.

BRIEF DESCRIPTION OF THE DRAWING

The above and other objects and features of the present invention will become apparent from the following description of preferred embodiments given in conjunction with the accompanying drawing, which shows an optimum range of twin domain width distribution of the grains constituting dielectric layers incorporated in a ceramic capacitor in accordance with the present invention.

DETAILED DESCRIPTION OF THE PREFERRED EMBODIMENTS

The term "twin" used herein refers to that represented by a group of parallel black and white line patterns formed in a barium titanate grain having a core-cell structure when observed along the (110) direction by a TEM (Transmission Electron Microscope); and the term "twin domain width" is a period of the line patterns measured in a perpendicular direction to the group of lines.

EXAMPLE 1

Compound powders of $Ho_2O_3$ of 1.0 mol part, MgO of 0.5 mol part, $Mn_2O_3$ of 0.25 mol part and oxide glass of 1.0 wt % having $Li_2O$—$B_2O_3$—$SiO_2$—BaO as a main component were mixed with $BaTiO_3$ of 100 mol part and ground for 15 to 24 hours by employing a wet method in a ball mill containing therein PSZ (Partially Stabilized Zirconia) balls, to thereby obtain a mixture.

The main component, i.e., $BaTiO_3$, was in a form of powder manufactured by using a hydrothermal synthesis method yielding high crystallinity. The glass serves as a sintering additive, that makes a sintering be completed before a solid solution of an excessive amount of additive elements is formed in the core.

Next, the mixture was dehydrated, dried and calcined in air at 800° C. to obtain a calcined material. The calcined material was ground in ethanol and dried. The dried material was then mixed with an organic binder and a solvent to provide a ceramic slurry, which was then used for preparing green sheets having a thickness of 5 μm by employing a doctor blade method.

Subsequently, a conductive paste having Ni powder as a main component was applied on the green sheets by using a print method to form internal electrodes. Ten sheets of the ceramic green sheets having the internal electrodes thereon were stacked and thermocompressed to form a laminated body. The laminated body was then diced into a multiplicity of 3216 type chip-shaped ceramic bodies having a size of 3.2 mm×1.6 mm.

Thereafter, Ni external electrodes were formed on the chip-shaped ceramic bodies by using a dipping method. The organic binder contained in the chip-shaped ceramic bodies was removed in an $N_2$ atmosphere. The binder-removed ceramic bodies were then heat treated under an atmosphere having oxygen partial pressure in the order of $10^{-5}$ to $10^{-8}$ atm to obtain sintered bodies of a chip shape.

The sintered bodies were reoxidized in an $N_2$ atmosphere in a temperature range of 600 to 1000° C. to thereby obtain multilayer ceramic capacitors, wherein a thickness of each layer incorporated in the multilayer ceramic capacitor was about 3 μm.

Next, multilayer ceramic capacitors were polished in a direction perpendicular to the stacking direction of the ceramic green sheets until a thickness thereof became about 30 μm. Then, they were further thinned by applying ion milling. For each specimen, 300 grains in the dielectric layers disposed between the internal electrodes were observed by a TEM (Transmission Electron Microscope) along the (110) direction and the domain widths of the twins formed in each grain were measured.

The ratio of grains having the domain width less than 20 nm, from 20 nm to 50 nm, and greater than 50 nm are tabulated in Table. Since the observed domain width of twin varies depending on the observation direction, the domain width was measured in one direction, i.e., the (110) direction.

Next, for each specimen, dielectric constant and capacitance variation were measured, and the accelerated life test was performed.

The measurement and test results of dielectric constant $\epsilon$, tan $\delta$, temperature characteristics and the accelerated life for each specimen are listed in Table.

Electrical characteristics were measured as follows:

(A) The dielectric constant ($\epsilon$) was computed based on a facing area of a pair of neighboring internal electrodes, a thickness of a dielectric layer positioned between the pair of neighboring internal electrodes, and the capacitance of a multilayer ceramic capacitor obtained under the condition of applying at 20° C. a voltage of 1.0 V (root mean square value) with a frequency of 1 kHz.

(B) The dielectric loss tan $\delta$ (%) was obtained under the same condition as established for measuring the dielectric constant cited above.

(C) The capacitance variations $\Delta C/C_{20}$ and $\Delta C/C_{25}$ were obtained by measuring capacitances at 85° C. and 125° C. in a thermostatic (or constant temperature) oven under the condition of applying a voltage of 1 V (rms value) with a frequency of 1 kHz, wherein $C_{20}$ and $C_{25}$ represent capacitances at 20° C. and 25° C. respectively; $\Delta C$ represents the difference between $C_{20}$ and a capacitance at 85° C. or between $C_{20}$ and a capacitance at 125° C.

(D) Accelerated life (second) was obtained by measuring a time period until an insulation resistivity ($\rho$) becomes $1\times10^{10}$ Ωcm in a DC (direct current) electric field of 20 V/μm at 150° C.

TABLE

| Sample No. | Microscopic structure Ratio of grains as a function of Domain width [%] | | | Electrical characteristics of ceramic capacitor | | | | |
|---|---|---|---|---|---|---|---|---|
| | Less than 20 nm | 20 nm to 50 nm | Greater than 50 nm or without twin | Dielectric constant | tan $\delta$ [%] | Capacitance variation $\Delta C/C_{20}$ [%] at 85° C. | Capacitance variation $\Delta C/C_{25}$ [%] at 125° C. | Accelerated life [seconds] |
| 1·X· | 49 | 27 | 24 | 2630 | 2.9 | −7.1 | −13.3 | 330000 |
| 2·X· | 57 | 32 | 11 | 3200 | 3.4 | −9.8 | −14.5 | 240000 |
| 3 | 71 | 13 | 16 | 3810 | 1.9 | −9.3 | −13.9 | 270000 |
| 4 | 55 | 10 | 35 | 3300 | 2.9 | −8.0 | −12.3 | 410000 |
| 5·X· | 73 | 20 | 7 | 3500 | 1.8 | −11.3 | −16.1 | 210000 |
| 6 | 69 | 17 | 14 | 3470 | 2.4 | −9.7 | −14.3 | 310000 |
| 7 | 63 | 9 | 28 | 3530 | 2.2 | −8.9 | −14.0 | 320000 |
| 8·X· | 48 | 32 | 20 | 2580 | 3.2 | −8.3 | −13.4 | 330000 |
| 9 | 72 | 18 | 10 | 3720 | 1.7 | −9.5 | −14.5 | 250000 |
| 10 | 66 | 22 | 12 | 3240 | 2.5 | −9.0 | −13.6 | 380000 |
| 11 | 51 | 15 | 34 | 3130 | 2.7 | −7.9 | −12.7 | 470000 |
| 12 | 78 | 11 | 11 | 3580 | 2.1 | −9.8 | −12.9 | 350000 |
| 13·X· | 81 | 12 | 7 | 3710 | 1.8 | −10.5 | −17.3 | 170000 |
| 14·X· | 60 | 31 | 9 | 3250 | 3.1 | −11.8 | −21.1 | 260000 |
| 15 | 65 | 20 | 15 | 3510 | 2.4 | −8.8 | −13.3 | 360000 |
| 16 | 73 | 8 | 19 | 3830 | 1.8 | −9.4 | −14.2 | 230000 |
| 17 | 54 | 17 | 29 | 3220 | 2.7 | −9.1 | −13.9 | 450000 |

Referring to Table, the specimens 3, 4, 6, 7, 9 to 12 and 15 to 17 show that if the portion of the grains with the domain width less than 20 nm is in the range from 50% to 80%, that with the domain width in the range from 20 nm to 50 nm is less than or equal to 30%, and that with the domain width greater than 50 nm or without twin is equal to or greater than 10%, the dielectric constant ($\epsilon$) is equal to or greater than 3000, the capacitance variation $\Delta C/C_{20}$ at 85° C. is within about −10%, the capacitance variation $\Delta C/C_{25}$ at 125° C. is within about −15%, tan $\delta$ is less than or equal to 3% and the accelerated life is equal to or greater than 200,000 seconds.

However, if the portion of the grains with the domain width less than 20 nm is smaller than 50% as in the specimens 1 and 8, the dielectric constant becomes less than 3000 and/or tan $\delta$ becomes greater than 3%. The specimen 13 shows that, in case where the portion of the grains with the domain width less than 20 nm is greater than 80%, the capacitance variations are deteriorated and the accelerated life is less than 200,000 seconds.

Further, the specimens 2, 8 and 14 show that, in case where the portion of the grains having a domain width in the range from 20 to 50 nm is greater than 30%, tan $\delta$ is greater than 3%, the dielectric constant is less than 3000 or the capacitance variation deteriorates. In addition, the specimens 5, 13 and 14 show that, in case where the portion of the grains with the domain width greater than 50 nm or without the twin is less than 10%, the capacitance variations deteriorate.

EXAMPLE 2

$Ho_2O_3$ of Example 1 was partially or entirely replaced by other rare earth oxide, e.g., $Sm_2O_3$, $Eu_2O_3$, $Tb_2O_3$, $Dy_2O_3$, $Er_2O_3$, $Tm_2O_3$, $Yb_2O_3$, $Y_2O_3$. It was found that the capacitors obtained through same manufacturing procedure as in Example 1 exhibited same microscopic twin structure and electrical characteristics as those of Example 1.

Further, when $Mn_2O_3$ was replaced partially or entirely by $Cr_2O_3$ and $V_2O_5$, capacitors obtained through a same manufacturing procedure as in Example 1 also exhibited same microscopic twin structure and electrical characteristics as those of Example 1.

Furthermore, when the glass of 1.0 wt % was replaced by $SiO_2$ of 1.0 wt %, capacitors obtained through a same manufacturing procedure as in Example 1 also exhibited same microscopic twin structure and electrical characteristics as those of Example 1.

As the additives are diffused into $BaTiO_3$ grains to form solid solution and the crystallinity of the $BaTiO_3$ grains deteriorates, the period of the line patterns of the twin in the forms of parallel black and white lines becomes greater. If the crystallinity becomes further worsened, the line patterns of twin cannot be observed. Thus, in the present invention, the grains without twin are equally treated as those having the domain width greater than 50 nm.

Further, it is preferable that the ceramic grains include oxides of Ba and Ti as main components, oxides of Re and Mg, and one or more oxides selected from the group consisting of Mn, V and Cr, wherein Re represents one or two elements selected from the group consisting of Sm, Eu, Gd, Tb, Dy, Ho, Er, Tm, Yb and Y.

Furthermore, it is preferable that the dielectric ceramic composition includes 100 mol part of an oxide of Ba and Ti; 0.25 to 1.5 mol part of an oxide of Re; 0.2 to 1.5 mol part of an oxide of Mg; and 0.025 to 0.25 mol part of oxides of one or more elements selected from the group consisting of Mn, V and Cr, wherein the content of the oxide of Ba and Ti is calculated by assuming that the oxide of Ba and Ti is $BaTiO_3$; the content of the oxide of Re is calculated by assuming that the oxide of Re is $Re_2O_3$; the content of the oxide of Mg is calculated by assuming that the oxide of Mg is MgO; and the content of oxides of Mn, V and Cr is calculated by assuming that the oxides of Mn, V and Cr are $Mn_2O_3$, $V_2O_5$ and $Cr_2O_3$, respectively.

Further, it is preferable that the sintered ceramic body includes $SiO_2$ or a glass component having $SiO_2$, wherein the content of the glass component ranges from 0.05 to 5 wt %.

While the invention has been shown and described with respect to the preferred embodiments, it will be understood by those skilled in the art that various changes and modifications may be made without departing from the spirit and scope of the invention as defined in the following claims.

What is claimed is:

1. A dielectric ceramic composition comprising:
   sintered ceramic grains having a core-shell structure,
   wherein 50%~80% of the grains have a domain width of twin smaller than 20 nm; not greater than 30% of the grains have a domain width of twin in the range from 20 nm to 50 nm; not smaller than 10% of the grains have a domain width of twin greater than 50 nm or have no twin.

2. The dielectric ceramic composition of claim 1, wherein the sintered ceramic grains include oxides of Ba and Ti as main components.

3. The dielectric ceramic composition of claim 1, wherein the sintered ceramic grains include an oxide of Re, an oxide of Mg, and oxides of one or more elements selected from the group consisting of Mn, V and Cr, Re representing one or two elements selected from the group consisting of Sm, Eu, Gd, Tb, Dy, Ho, Er, Tm, Yb and Y.

4. The dielectric ceramic composition of claim 1 further comprising about 100 mol part of an oxide of Ba and Ti; about 0.25 to 1.5 mol part of an oxide of Re; about 0.2 to 1.5 mol part of an oxide of Mg; and 0.025 to 0.25 mol part of oxides of one or more elements selected from the group consisting of Mn, V and Cr, wherein the content of the oxide of Ba and Ti is calculated by assuming that the oxide of Ba and Ti is $BaTiO_3$; the content of the oxide of Re is calculated by assuming that the oxide of Re is $Re_2O_3$; the content of the oxide of Mg is calculated by assuming that the oxide of Mg is MgO; and the content of oxides of Mn, V and Cr is calculated by assuming that the oxides of Mn, V and Cr are $Mn_2O_3$, $V_2O_5$ and $Cr_2O_3$, respectively, Re representing one or two elements selected from the group consisting of Sm, Eu, Gd, Tb, Dy, Ho, Er, Tm, Yb and Y.

5. The dielectric ceramic composition of claim 1, wherein the sintered ceramic grains include $SiO_2$ or a glass component having $SiO_2$.

6. The dielectric ceramic composition of claim 5, wherein the glass component ranges from 0.05 to 5 wt %.

7. The dielectric ceramic composition of claims 1, wherein a dielectric constant is equal to or greater than 3000.

8. A ceramic capacitor comprising:
   more than one internal electrode; and
   one or more dielectric layers composed of a dielectric ceramic composition, each of the dielectric layers being sandwiched between two neighboring internal electrodes,
   wherein the dielectric ceramic composition includes sintered ceramic grains having a core-shell structure,
   wherein 50%~80% of the grains have a domain width of twin smaller than 20 nm; not greater than 30% of the grains have a domain width of twin in the range from 20 nm to 50 nm; not smaller than 10% of the grains have a domain width of twin greater than 50 nm or have no twin.

9. The ceramic capacitor of claim 8, wherein the sintered ceramic grains include oxides of Ba and Ti as a main component.

10. The ceramic capacitor of claim 8, wherein the sintered ceramic grains include an oxide of Re, and oxide of Mg, and oxides of one or more elements selected from the group consisting of Mn, V and Cr, Re representing one or two elements selected from the group consisting of Sm, Eu, Gd, Tb, Dy, Ho, Er, Tm, Yb and Y.

11. The ceramic capacitor of claim 8 further comprising about 100 mol part of an oxide of Ba and Ti; about 0.25 to 1.5 mol part of an oxide of Re; about 0.2 to 1.5 mol part of an oxide of Mg; and 0.025 to 0.25 mol part of oxides of one or more elements selected from the group consisting of Mn, V and Cr, wherein the content of the oxide of Ba and Ti is calculated by assuming that the oxide of Ba and Ti is $BaTiO_3$; the content of the oxide of Re is calculated by assuming that the oxide of Re is $Re_2O_3$; the content of the oxide of Mg is calculated by assuming that the oxide of Mg is MgO; and the content of oxides of Mn, V and Cr is calculated by assuming that the oxides of Mn, V and Cr are $Mn_2O_3$, $V_2O_5$ and $Cr_2O_3$, respectively, Re representing one or two elements selected from the group consisting of Sm, Eu, Gd, Tb, Dy, Ho, Er, Tm, Yb and Y.

12. The ceramic capacitor of claim 8, wherein the sintered ceramic grains include $SiO_2$ or a glass component having $SiO_2$.

13. The ceramic capacitor of claim 12, wherein the glass component ranges from 0.05 to 5 wt %.

14. The ceramic capacitor of claim 8, wherein the internal electrodes are formed of a base metal.

15. The ceramic capacitor of claim 8, wherein the ceramic capacitor fulfills X7R characteristics (EIA standards) or B characteristics (EIAJ standards).

16. The ceramic capacitor of claim 8, wherein a dielectric constant is equal to or greater than 3000.

* * * * *